May 19, 1936.                A. ROSNER                2,041,489
                           CABLE CONNECTION
                     Original Filed March 18, 1929
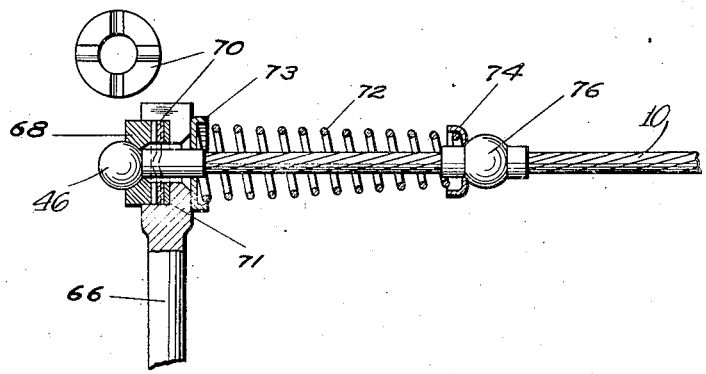
INVENTOR.
ADOLPH ROSNER
BY Jerome R. Cox
ATTORNEY.

Patented May 19, 1936

2,041,489

UNITED STATES PATENT OFFICE 2,041,489

CABLE CONNECTION

Adolph Rosner, Rockton, Ill., assignor, by mesne assignments, to Bendix Brake Company, South Bend, Ind., a corporation of Illinois Original application March 18, 1929, Serial No. 347,882. Patent No. 2,009,206, dated July 23, 1935. Divided and this application December 10, 1932, Serial No. 646,726

2 Claims. (Cl. 287—87)

This application is a division of my copending application Serial No. 347,882.

This invention relates to a power transmission element and mechanism formed by novel process and methods.

Important features of the invention relate to a method of preforming one end of a flexible cable to novel connections between the enlarged cable ends and rigid power transmission elements; and to various other details of construction and combinations of parts particularly set forth in the following descriptive matter and shown in the accompanying drawing, in which:

The figure is a view, partly in section and partly in side elevation, of my novel operating connection.

The invention is shown embodied in an operating connection for a flexible stranded steel cable 10 having at its end an integral head 46 adapted to be secured to the radially slotted end of a rigid lever 66. The head 46 is shown resting against a seat in the form of a plain-faced washer 68, which in turn bears against a plain washer 70, which bears against another plain washer 71 contacting the base of a cylindrical recess in the lever end. A compression spring 72 confined between stops or washers 73 and 74, one engaging the lever and the other an enlargement 76 integral with the cable, serves to retain the head of the cable in its seat, and also serves yieldingly to resist flexing of the end portion of the cable.

While one particular embodiment of my invention has been described in detail, it is not my intention to limit the scope of the invention to that particular embodiment, or otherwise than by the terms of the appended claims. The present application is a division of my application No. 347,882, filed March 18, 1929, Patent No. 2,009,206 granted July 23, 1935.

I claim:

1. Transmission means comprising a lever member having a cylindrical recess in its end in combination with a headed flexible tension element seated within a recessed washer member in said recess and a compression spring surrounding said tension element and confined between stops abutting said lever and tension element, said spring serving to retain the tension element in its operative position.

2. Transmission means comprising a rotatable lever member having a recess, a flexible element provided with a ball shaped end seated within said recess, said flexible element having an enlarged part spaced from said ball shaped end and being flexible between said end and said part, and a coil spring sleeved on the flexible element and compressed between the enlarged part and the lever member and flexing with the part of the flexible element on which it is sleeved and having the two functions of holding said end seated in said recess and of yieldingly resisting flexing of said part of the flexible element.

ADOLPH ROSNER.